United States Patent [19]
Hsu

[11] Patent Number: 5,423,533
[45] Date of Patent: Jun. 13, 1995

[54] GAME RACKET OF COMPOSITE MATERIAL

[76] Inventor: Henry Y. C. Hsu, P.O. Box 1750, Taichung,

[21] Appl. No.: 219,013

[22] Filed: Mar. 28, 1994

[51] Int. Cl.6 ............................................. A63B 49/10
[52] U.S. Cl. .................. 273/73 R; 273/73 C; 273/73 G
[58] Field of Search ................. 273/73 R, 73 C, 73 F, 273/73 G

[56] References Cited

U.S. PATENT DOCUMENTS

| | | | |
|---|---|---|---|
| 4,340,226 | 7/1982 | Haines | 273/73 F |
| 4,725,059 | 2/1988 | Du Gardin et al. | 273/73 F |
| 5,174,568 | 12/1992 | You | 273/73 F |
| 5,273,279 | 12/1993 | You | 273/73 F |

*Primary Examiner*—Raleigh W. Chiu
*Attorney, Agent, or Firm*—Charles E. Baxley

[57] ABSTRACT

A game racket frame of a composite material comprises a frame, a triangular throat portion and a plurality of reinforcing pieces. The frame is made by the filament winding method. The triangular throat portion is made of a foam material wrapped with a continuous fiber preimpregnated with resin. The reinforcing pieces are made of a continuous fiber preimpregnated with resin. The reinforcing pieces of a predetermined size and angle are used to reinforce the top portion of the frame, the areas of the frame corresponding in location to five and sevent of the clock, the string groove, and both ends of the triangular throat portion and uniting with the frame. The reinforced frame and the reinforced triangular throat portion are arranged in a molding tool in which the game racket frame of high quality is speedily formed.

2 Claims, 4 Drawing Sheets

GAME RACKET OF COMPOSITE MATERIAL

BACKGROUND OF THE INVENTION

The present invention relates generally to a game racket frame, and more particularly to a game racket frame made of a composite material.

The conventional game racket frame of the composite material is generally made by a method, in which the fibers impregnated with resin are formed into a composite material containing fibers which are arranged unidirectionally by a fiber-winding roller. The composite material so produced is then folded at various angles for being cut into various composite materials having different widths and lengths. The composite materials of various widths and lengths are stacked windingly to form a game racket frame and a triangular portion, which are subsequently arranged in a molding tool in which a game racket frame is made under heat and pressure. The game racket frame so made is characterized in that it has a better expansibility and a smooth surface, and that its frame and triangular portion are made integrally. However, the process of making such a prior art game racket frame as described above is not cost-effective in view of the fact that the manufacturing process is almost manually operated, and that the angle at which the composite material is folded and cut can not be varied easily, and further that a substantial amount of waste material is produced to complicate the environmental problems.

With a view to overcoming the shortcomings of the prior art method described above, a method known as the filament winding method was introduced. As shown in FIG. 1, the filament winding method involves the production of a tubular element 10, which is made of the fibers preimpregnated with resin by winding. The tubular element 10 is bent to have the form of a game racket frame 11 and a triangular throat portion 12, as shown in FIG. 2, and is then subject to a B-stage treatment before being arranged in the mold cavity 14 of a molding tool 13 provided with an air valve 15 through which the air is forced thereinto. The molding tool 13 is heated under pressure. Upon completion of a hardening process, the molding tool 13 in opened to remove therefrom a newly formed game racket frame of the composite material. The filament winding method can be automated to reduce the labor cost and to improve the production efficiency. In addition, the waste material produced in the filament winding method is reduced in quantity. Nevertheless, the game racket frame of the composite material and made by the filament winding method has several shortcomings, which are described explicitly hereinafter.

The triangular throat portion has a limited length, thereby resulting in a technical difficulty in implementing the filament winding method and in an increase in the production cost. In addition, the triangular throat portion made by the filament winding method can not be caused to cooperate well with the frame to form a good air blowing loop.

The construction of the game racket frame of the composite material made by the filament winding method is defective in design in that the fiber expansibility is unduly limited to result in the game racket frame being nonuniform in thickness, and that the gaps are formed among the wound fibers, thereby undermining the structural strength of the game racket frame. Although the structure of the game racket frame can be strengthen by means of increasing the layers of the wound fibers, it is not allowable to increase the layers of the wound fibers too much in view of the strict weight limit of the game racket frame.

The different spots of the game racket frame will suffer different stresses, in view of the different shapes and the changes of striking positions of the game racket frames. Consequently, it is required to reinforce the weak spots of the game racket frame. In theory, the requirement can be met by reinforcing the weak spots with additional wound fibers; nevertheless it is technically infeasible that such a reinforcement can often result in an excessive amount of the fibers 16 that are arranged at 90° orientation in the area where the wound fibers are turned. In other words, such a reinforcement as described above can result in the concentration of stress and can even weaken the structure of the game racket frame. Furthermore, the reinforcement of the weak spots can be also done by a change in the winding angle of the additional wound fibers, however; in view of the strict weight limit of the game racket frame and the limit of the winding speed, such a reinforcement is technically feasible only with a tubular element having a relatively large diameter and not with a tubular element having a small diameter of the game racket frame. And, as shown in FIG. 3, if various local reinforcements are done within the same winding layer by a change in the winding angle in various specific areas, the changed winding angle must be greater than the original winding angle. Any winding angle that is greater than the original winding angle can undermine the structural strength of the reinforced areas.

The frame of the game racket is generally provided with a groove to facilitate the stringing. It is conceivable that the shock wave is transmitted to the string groove from the strung surface impacted by a ball. It is therefore necessary to have the string groove that is stronger structurally. The stress direction of the string must form a great angle with the string groove. There is a strict weight limit of the game racket frame, so it is technically infeasible to reinforce the string hole areas by the filament winding method in view of the fact that the reinforcement of the string groove will result in an excessive increase in the weight of the game racket frame. In addition, the reinforcement of the string groove by a winding near 0° orientation, as indicated by the dotted lines in FIG. 4, will not result in a meaningful reinforcement of the structural strength of the string hole area of the game racket.

SUMMARY OF THE INVENTION

It is therefore the primary objective of the present invention to provide a game racket frame of the composite material, which can be made easily.

In keeping with the principle of the present invention, the foregoing objective of the present invention is attained by a game racket frame of the composite material, which comprises a frame, a triangular portion and a plurality of reinforceing pieces. The frame is made by the filament winding method while the triangular portion and the reinforcing pieces are made of a continuous fiber preimpregnated with resin. The reinforcing pieces are used to enhance the strength of structurally deficient portions of the frame before the frame and the triangular portion are arranged in a molding tool in which the game racket frame of the composite material is formed integrally under heat and pressure.

The foregoing objective, structures, functions and features of the present invention will be more readily understood upon a thoughtful deliberation of the following detailed description of the present invention in conjunction with the drawings provided herewith.

FIG. A—A shows a partial sectional view of the present invention.

FIG. B—B shows another partial sectional view of the present invention.

Figure 8:
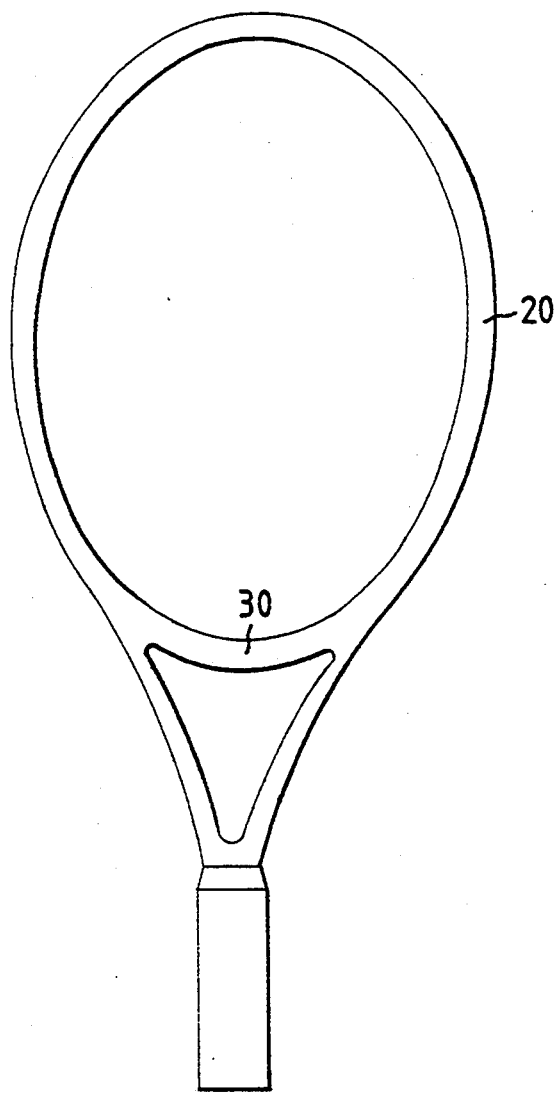

FIG. 8 shows a perspective view of a game racket frame of the present invention.

DETAILED DESCRIPTION OF THE INVENTION

Figure 1:
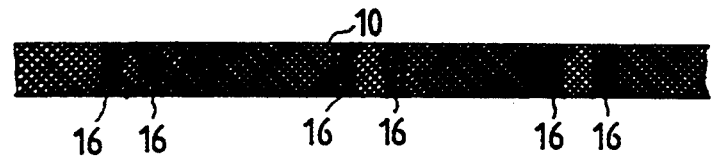
FIG. 1 shows a schematic view of a prior art tubular member made by the filament winding method.
Figure 2:
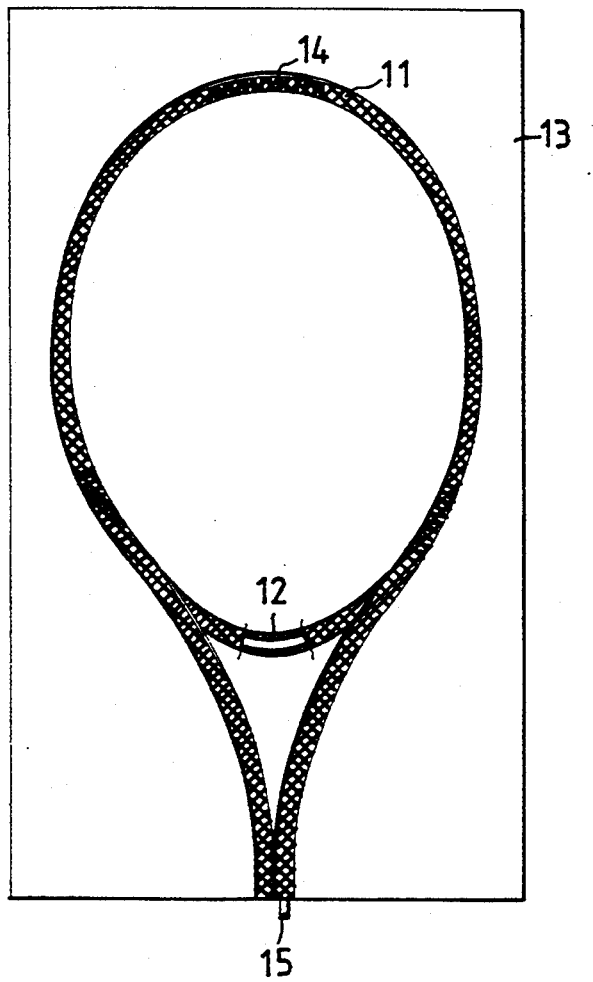
FIG. 2 shows a schematic view of the production of a prior art game racket frame made by the filament winding method.
Figure 3:
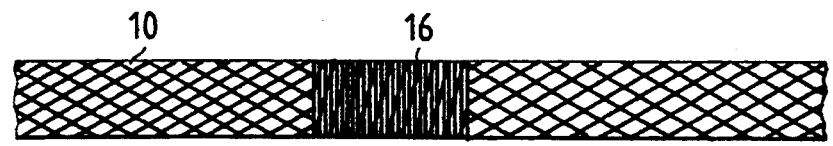
FIG. 3 is a schematic view showing that a prior art frame tubular member is wound by the filament winding method.
Figure 4:
FIG. 4 is a schematic view showing that the string groove of the prior art game racket frame is reinforced by the filament winding method.
Figure 7:
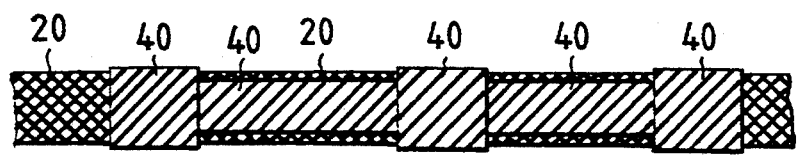
FIG. 7 shows a schematic view of the reinforcement structure of the present invention.
Figure 5:
FIG. 5 shows a schematic view of the structure of a tubular member made by the filament winding method, according to the present invention.
Figure 6:
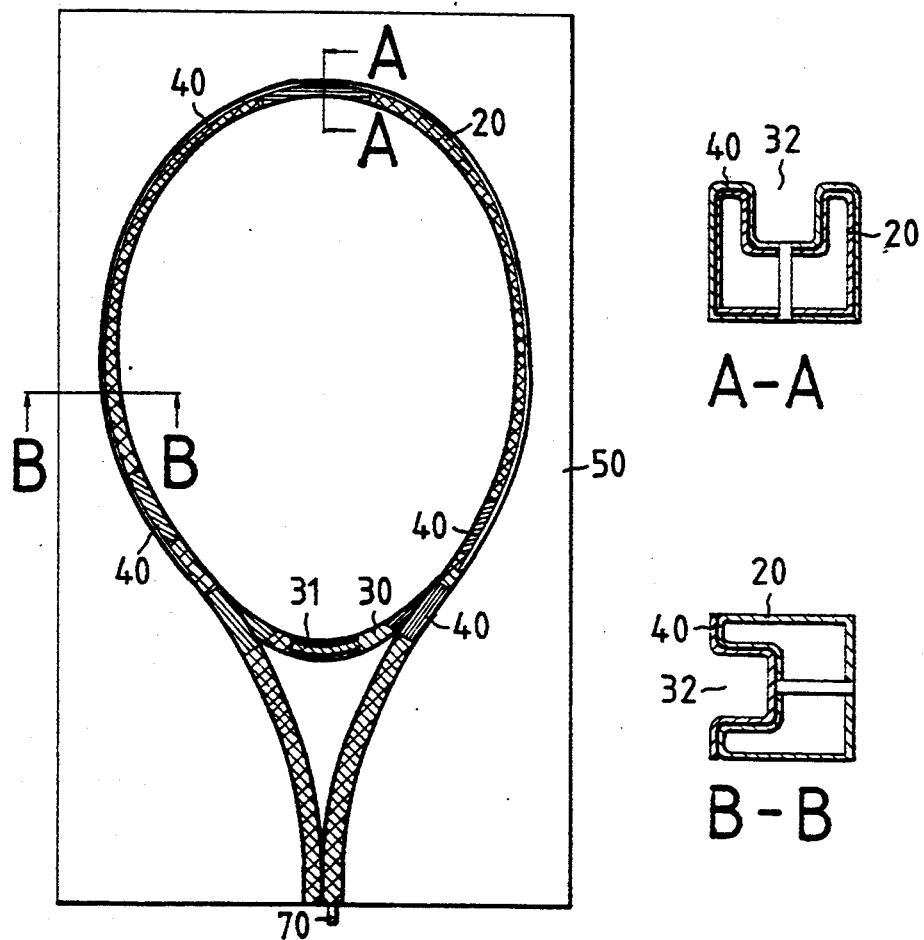
FIG. 6 shows a schematic view of the production of a game racket frame of the present invention, which is made by the filament winding method.

As shown in FIGS. 5 and 6, a game racket frame of the composite material of the present invention is composed of a frame 20, a triangular throat portion 30, and a plurality of reinforcing pieces 40.

The frame 20 is made of a tubular member by the filament winding method, in which the fiber sheets preimpregnated with resin are wound rapidly by means of a winding machine to form the tubular member having an appropriate length, as shown in FIG. 5. The tubular member is then subjected to a B-stage treatment before it is bent to have the shape of a game racket frame. The triangular throat portion 30 is made of a foam material 31 which is wrapped by the continuous fiber preimpregnated with resin. Each of the reinforcing pieces 40 is made of a continuous fiber of an appropriate size and preimpregnated with resin. The reinforcing pieces 40 are used to reinforce the structurally deficient portions of the frame 20, such as the top portion of the frame 20, the portions corresponding to five and seven of the clock, both ends of the triangular throat portion 30, and the string groove 32 as shown in FIGS. A—A and B—B. The weight total of the reinforcing pieces 40 is about 5-25%, preferably 10-15%, of the weight total of the frame 20 and the triangular throat portion 30. The frame 20, the triangular portion 30 and the reinforcing pieces 40 are arranged in the mold cavity 60 of a molding tool 50 provided with an air valve 70 through which the air is blown into the molding tool 50 under heat and pressure. The game racket frame of the composite material of the present invention is made integrally in the molding tool 50. Upon completion of the hardening of the frame 20, the triangular throat portion 30 and the reinforcing pieces 40, the molding tool 50 is opened to remove therefrom a newly formed game racket frame of the composite material, as shown in FIG. 8.

The triangular throat portion 30 is made of the foam material 31 wrapped by the continuous fiber preimpregnated with resin. The triangular throat portion 30 and the frame 20 are arranged in the molding tool in which the foam material 31 of the triangular throat portion 30 is caused to foam so as to form integrally with the hollow frame 20. Such a method as described above is easy and devoid of the shortcomings of the filament winding method of the prior art. In addition, the reinforcing pieces 40 are light in weight and composed of continuous fibers which reinforce the frame 20 at the best angle so as to overcome the shortcoming of the structural deficiency of the frame made by the filament winding method of the prior art. For this reason, the production of the frame 20 of the present invention can be automated to improve the production efficiency as well as the quality control. In addition, such a production automation as mentioned above can reduce the amount of the waste material which is a potential pollutant of the environment.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. An improved game racket of a composite material comprising a frame, a triangular throat portion and a plurality of reinforcing pieces; wherein said frame is made of a tubular member of a predetermined length by a filament winding method, with said tubular member having the shape of a game racket frame by bending; wherein said triangular throat portion is made of a foam material wrapped with a continuous fiber preimpregnated with resin; wherein said reinforcing pieces have a predetermined size and a predetermined angle and are made of a continuous fiber preimpregnated with resin, said reinforcing pieces being used to reinforce a plurality of structurally deficient areas of said frame and said triangular throat portion; and wherein said frame reinforced by said reinforcing pieces and said triangular throat portion reinforced by said reinforcing pieces are arranged in a molding tool in which an improved game racket frame of a composite material is formed under heat and pressure.

2. The improved game racket of claim 1 wherein said reinforcing pieces are attached to a top portion of said frame, portions of said frame corresponding in location to five and seven of the clock, a string groove of said frame, and both ends of said triangular throat portion and uniting with said frame, said reinforcing pieces having a weight total equal to 5-25%, of a weight total of said frame and said triangular throat portion.

* * * * *